Patented July 28, 1925.

1,547,868

UNITED STATES PATENT OFFICE.

CHARLES R. FRANKLIN, OF DOVER, NEW JERSEY.

PROPELLENT POWDER.

No Drawing.     Application filed October 8, 1923. Serial No. 667,360.

(GRANTED UNDER THE ACT OF MARCH 3, 1883; 22 STAT. L. 625.)

*To all whom it may concern:*

Be it known that I, CHARLES R. FRANKLIN, a citizen of the United States, and a resident of Dover, county of Morris, and State of New Jersey, have invented an Improvement in Propellent Powders, of which the following is a specification.

The invention described herein may be used by the Government, or any of its officers or employees in prosecution of work for the Government, or by any other person in the United States, without payment to me of any royalty thereon, in accordance with the act of March 3, 1883.

The present invention relates to propellent powder.

The primary object of my invention is the provision of a propellent powder which will be non-hygroscopic, and which will have the required ballistic qualities.

A further object is the establishment of a method for making such a powder.

These objects are obtained by the steps outlined in the process and especially by first rolling or pressing the material preferably while heating the same and then subjecting the material to a seasoning period, such period lasting preferably until practically all the moisture is expelled and then again subjecting the material to rolling or pressing and preferably heating during such rolling or pressing.

The process which constitutes the subject of this invention is used, principally, in making nitrocellulose, nitroglycerine powder mixtures, that is, powders in which nitrocellulose and nitroglycerine are present as ingredients.

Powders of this character have heretofore been made but the process used in combining such powders failed to produce the most desirable compositions for the reasons that there is not a proper and thorough dissemination and combination of colloiding action through the mass.

In the process outlined herein the nitrocellulose and nitroglycerine are more homogeneously combined and the colloiding action is properly disseminated and combined throughout the mass.

In carrying out my invention nitrocellulose of approximately 13% nitrogen content, more or less, is mixed with a large excess of water from 6 to 10 times the weight of the nitrocellulose so that the mixture has an appearance not unlike emulsion. The necessary amount of nitroglycerine is added to this mixture with rapid agitation or stirring; a better distribution of the nitroglycerine is accomplished by the most violent agitation. The stirring operation is continued for a proper period, which in practice has been found to be at least 30 minutes after the last portion of the nitroglycerine has been added. This step, in the manufacture on account of the large amount of water present, is designated "wet mixing".

The mixture thus formed is then transferred to a centrifuge or other machine having the similar function and the excess water wrung out so that the moisture content of the solid material is not less than 30%, nor more than 45%, preferably 30%.

The material is then passed through pressure rolls heated to an appropriate temperature which in practice has been found to be between 80° C. to 100° C. This process is designated in the manufacture as the first or preliminary rolling and has a two-fold function in that the excess of water is removed and the nitroglycerine is assisted, by the pressure exerted, in its colloiding action on the nitrocellulose.

The rolled material is then spread on trays and seasoned for an appropriate period which in practice has been found to be at least 24 hours at a temperature of 50° C. to 60° C. During this period the material becomes almost free from moisture.

The partially dried, seasoned material is then transferred to a dough mixing machine similar to that used in the manufacture of U. S. Army service powder. Approximately 40% of its weight of acetone or other volatile solvent containing the necessary amount of "Vaseline," which has previously been melted, is added and the mass mixed for a proper period, which in practice has been found to vary from 45 minutes to an hour.

The material is then transferred to pressure rollers heated to a temperature of 40° C. to 60° C. until the material takes on a uniform, colloided appearance.

The material is removed from the machine in the form of a tough, pliable, translucent sheet of powder approximately 24 inches wide and from 3 to 5 inches in length, these dimensions however, depending on the use to which the powder is to be put.

The powder sheets are then cut and stamped to the shape and size desired.

The material is then dried for a suitable period and at an appropriate temperature, which in practice has been found to vary from 2 to 4 days at a temperature of 50° C. to 60° C.

A powder manufactured under the process described has been found to fully answer all ballistic requirements and to be especially useful as a propellent with 4-inch trench mortars and weapons having similar shaped projectiles, but it is by no means limited to such a use.

A powder made according to the process described may be a composition such as follows:

Nitrocellulose (13% N) 54%, nitroglycerine 43%, "Vaseline" 3%.

The formula given above is cited as an example of one mixture which has been found to give successful results in practice; various other compositions in which the ingredients are varied will occur immediately to those skilled in the art and it is by no means intended to limit my invention to the manufacture of a powder having the constituents and proportions recited.

I claim:

1. The process of preparing a propellent powder consisting in first mixing nitrocellulose of approximately 13% nitrogen content with a large excess of water until it has an emulsion like appearance, then adding nitroglycerine to the mixture with rapid agitation, then wringing out the excess of water, then passing the material through heated pressure rolls, then seasoning, then mixing the seasoned material with a volatile solvent and "Vaseline", then again passing the mixture thus formed through heated pressure rolls, then cutting to the desired shapes and sizes and then drying.

2. The process of preparing a propellent powder consisting in first mixing nitrocellulose of suitable nitrogen content with a large excess of water, then adding nitroglycerine to the mixture with rapid agitation, then wringing out the excess of water, then passing the material through heated pressure rolls, then seasoning, then mixing the seasoned material with a solvent and "Vaseline", then, again, passing the mixture through heated pressure rolls and then cutting into desired shapes and sizes and then drying.

3. The process of preparing a propellent powder consisting in first mixing nitrocellulose of suitable nitrogen content with a large excess of water, then adding nitroglycerine to the mixture with rapid agitation, then wringing out the excess of water, then subjecting the material thus formed to pressure and heat, then seasoning, then mixing the seasoned material with a suitable solvent and "Vaseline", and then again subjecting the material to pressure and heat, then cutting to the desired shapes and sizes and drying.

4. The process of preparing a propellent powder consisting in first mixing nitrocellulose of suitable nitrogen content with a large excess of water, then adding nitroglycerine to the mixture with rapid agitation, then wringing out the excess of water, then subjecting the material to an appropriate pressure, then seasoning, then mixing the seasoned material with a solvent and "Vaseline," then, again, subjecting the mixture to pressure, then cutting to the desired shapes and sizes.

5. The process of preparing propellent powders, containing nitrocellulose and nitroglycerine as ingredients, consisting in suspending such ingredients in water, agitating the mixture, removing the excess water, passing the residue through heated pressure rolls, seasoning the material to expel practically all the moisture, adding to the seasoned material ingredients to reduce the hygroscopicity, again passing through pressure rolls, then cutting and drying.

6. The process of preparing propellent powders, containing nitrocellulose and nitroglycerine as ingredients, consisting in suspending such ingredients in a liquid, agitating the mixture, removing the excess liquid, subjecting the residue to pressure and heat, seasoning the material to expel practically all liquid therefrom and again subjecting the material to pressure.

CHARLES R. FRANKLIN.